Patented Apr. 7, 1953

2,634,301

UNITED STATES PATENT OFFICE 2,634,301

HALOGENATED PENTENES

Robert P. Ruh and Arthur F. Gordon, Midland, Mich., assignors to Dow Corning Corporation, Midland, Mich., a corporation of Michigan No Drawing. Application December 26, 1951, Serial No. 263,497

2 Claims. (Cl. 260—653)

This invention relates to fluorinated pentenes and their method of preparation.

It is an object of this invention to provide an economical and novel method for preparing a novel compound which is useful as an additive for lubricants and as intermediates in the preparation of more highly fluorinated pentenes. The latter are useful as additives in hydraulic fluids.

In accordance with this invention, the compound $CCl_2=CClCCl_2CHClCCl_3$ is contacted with liquid anhydrous HF at a temperature from 0° C. to 230° C. Under the above conditions the compound $C_5HCl_7F_2$ having a boiling point of about 80° C. at 1 mm. is obtained.

The above method may be carried out either at atmospheric pressure or at super-atmospheric pressure. Obviously when the temperature is above 19° C. it will be necessary to maintain pressure in the system in order to keep the HF in liquid state but otherwise the pressure is not critical.

The rate of the reaction will vary with the temperature. It is preferred that the reaction be carried out at temperatures from 90° C. to 200° C.

After completion of the reaction, the product is separated by distillation.

The following example is illustrative only and should not be construed as limiting the invention which is properly set forth in the appended claims.

Example 23.7 gram mols of $CCl_2=CClCCl_2CHClCCl_3$ was heated with 125 gram mols of HF in a nickel-copper autoclave at 140° C. for 6 hours. The pressure was about 500 p. s. i. The product was then removed from the autoclave, washed with water until neutral and dried over anhydrous calcium sulfate. The material was distilled and there was obtained in 71 per cent yield the compound $C_5HCl_7F_2$ boiling at 80° C. at 1 mm. The material had a density at 25° C. of 1.7458 and a refractive index at 25° C. of 1.5099.

That which is claimed is:

1. The method which comprises heating

$CCl_2=CClCCl_2CHClCCl_3$ with liquid HF at a temperature of from 0° C. to 230° C. whereby $C_5HCl_7F_2$ is obtained.

2. A linear compound of the formula $C_5HCl_7F_2$ having a boiling point of about 80° C. at 1 mm.

ROBERT P. RUH.
ARTHUR F. GORDON.

No references cited.